(12) United States Patent
Platzer

(10) Patent No.: US 7,676,028 B2
(45) Date of Patent: Mar. 9, 2010

(54) SYSTEM AND METHOD FOR STORING A VOICEMAIL MESSAGE IN A COMMUNICATION ENVIRONMENT

(75) Inventor: David B. Platzer, Garden Ridge, TX (US)

(73) Assignee: Cisco Technology, Inc., San Jose, CA (US)

( * ) Notice: Subject to any disclaimer, the term of this patent is extended or adjusted under 35 U.S.C. 154(b) by 1267 days.

(21) Appl. No.: 11/140,866

(22) Filed: May 31, 2005

(65) Prior Publication Data

US 2006/0285664 A1  Dec. 21, 2006

(51) Int. Cl.
*H04M 1/64* (2006.01)

(52) U.S. Cl. ............... 379/88.17; 709/203; 709/231; 709/232

(58) Field of Classification Search ........... 379/88.17; 709/203, 231, 232
See application file for complete search history.

(56) References Cited

U.S. PATENT DOCUMENTS

| | | | | |
|---|---|---|---|---|
| 5,268,957 A | 12/1993 | Albrecht | ............... | 379/67 |
| 5,557,798 A * | 9/1996 | Skeen et al. | ............ | 705/35 |
| 5,963,618 A * | 10/1999 | Porter | ............ | 704/270.1 |
| 6,032,039 A | 2/2000 | Kaplan | ............ | 455/413 |
| 6,330,079 B1 | 12/2001 | Dugan et al. | ............ | 358/403 |
| 6,389,276 B1 | 5/2002 | Brilla et al. | ............ | 455/413 |
| 6,442,589 B1 | 8/2002 | Takahashi et al. | ............ | 709/203 |
| 6,721,398 B1 | 4/2004 | Pitcher | ............ | 379/88.13 |
| 6,766,001 B1 | 7/2004 | Hanson | ............ | 379/88.26 |
| 6,874,011 B1 | 3/2005 | Spielman et al. | ............ | 709/206 |
| 2003/0174816 A1 | 9/2003 | Green et al. | ............ | 379/88.17 |
| 2003/0185354 A1 | 10/2003 | Green et al. | ............ | 379/88.17 |
| 2005/0238148 A1* | 10/2005 | Poustchi et al. | ............ | 379/88.17 |

* cited by examiner

*Primary Examiner*—Simon Sing
(74) *Attorney, Agent, or Firm*—Baker Botts L.L.P.

(57) ABSTRACT

Storing a voicemail message in a communication environment includes receiving a voicemail message at a first endpoint. The voicemail message is separated into a plurality of segments. The segments of the voicemail message, which comprise media bits, are distributed to a plurality of second endpoints.

27 Claims, 4 Drawing Sheets

SYSTEM AND METHOD FOR STORING A VOICEMAIL MESSAGE IN A COMMUNICATION ENVIRONMENT

TECHNICAL FIELD OF THE INVENTION

This invention relates generally to the field of communications and more specifically to a system and a method for storing a voicemail message in a communication environment.

BACKGROUND

Recent improvements in communication technology have provided endpoints with many different features. For example, endpoints may receive a voicemail message if a user is not currently available. The voicemail message is stored on a central server. The central server provides the voicemail to the user after receiving a request for the voicemail message.

SUMMARY OF THE DISCLOSURE

In accordance with the present invention, disadvantages and problems associated with storing a voicemail message in a communication environment may be reduced or eliminated.

According to one embodiment of the present invention, storing a voicemail message in a communication environment includes receiving a voicemail message at a first endpoint. The voicemail message is separated into a plurality of segments. The segments of the voicemail message, which comprise media bits, are distributed to a plurality of second endpoints.

Certain embodiments of the invention may provide one or more technical advantages. A technical advantage of one embodiment includes storing a voicemail message locally on an endpoint to provide a scalable system that adapts to an increasing number of users and endpoints. Another technical advantage of an embodiment includes distributing the voicemail message among endpoints in the system for redundancy or sharing of distributed resources. The voicemail message is still available to the user even if a central server or the local endpoint becomes inoperable.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 5, like numerals being used for like and corresponding parts of the various drawings.

Figure 1:
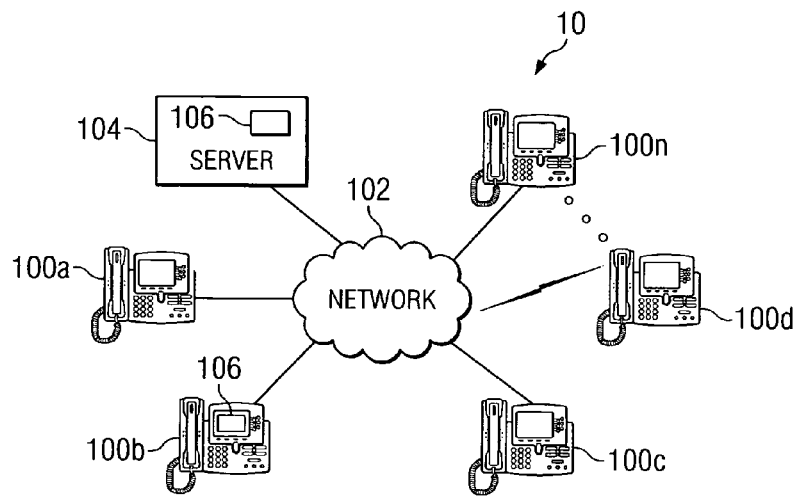
FIG. 1 illustrates a system including endpoints that have an ability to distribute a voicemail message within the system.

FIG. 1 illustrates a system 10 incorporating endpoints 100 that have an ability to distribute a voicemail message in a communication environment. System 10 includes one or more endpoints 100 that communicate over one or more networks 102. First endpoint 100 receives a voicemail message and distributes the voicemail message to a plurality of second endpoints 100.

According to the illustrated embodiment, system 10 includes endpoints 100a-n, where n represents any suitable integer number, that communicate with each other through networks 102. Endpoint 100a receives a voicemail message, stores the voicemail message, and distributes the voicemail message among endpoints 100b-100n. Endpoints 100 may send and receive data signals, audio signals, video signals, or any combination of the preceding. The signals may communicate information, such as data, audio, video, multimedia, and/or any suitable type of information. For example, endpoints 100 may participate in Internet Protocol (IP) based communication where voice information is communicated in voice packets. The communication may be in the form of a call, a voicemail, or any suitable form of communication. Endpoints 100 may include, for example, a telephone, an IP telephone, a wireless or cellular telephone, a computer supporting a telephony application, or any other endpoint suitable for communicating. Endpoint 100 may support, for example, IP, Session Initiation Protocol (SIP), Skinny Control Call Protocol (SCCP), H.323, or any suitable communication protocol. Endpoints 100 may store a voicemail message locally. The voicemail message may be stored in G.711, G.729, or any suitable compression or encoding protocol.

Network 102 allows endpoints 100 to communicate with other networks or endpoints 100. Network 102 may include a public switched telephone network (PSTN), a local area network (LAN), a wide area network (WAN), any other public or private data network, a local, regional, or global communication network such as the Internet, an enterprise intranet, other suitable wireline or wireless communication link, or any combination of the preceding. Network 102 may include any combination of gateways, routers, hubs, switches, access points, base stations, and any other hardware and/or software that may implement any suitable protocol or communication.

Server 104 manages communications of endpoints 100 using network 102. In an embodiment, server 104 participates in the reconstruction of a distributed voicemail message. Server 104 contains information about the distribution of a voicemail message in a distribution map 106. Distribution map 106 indicates how a voicemail message is distributed among endpoints 100b-n. When a user attempts to retrieve a voicemail message, distribution map 106 provides a guide to retrieve the distributed segments of the voicemail message and reconstruct the voicemail message for the user. Although described as a server, server 104 may also refer to any hub, switch, router, gateway, or other suitable network component that exchanges information with endpoints 100.

In operation, when a user of endpoint 100a is unavailable, the contacting user may leave a voicemail message on endpoint 100a. Endpoint 100a stores the voicemail message locally and distributes the voicemail message as segments among endpoints 100b-100n upon a triggering event occurring. In an embodiment, endpoint 100a may not store the voicemail message locally, but instead only distribute the voicemail message among endpoints 100b-100n. Distributing the voicemail message among the other endpoints 100b-100n ensures the voicemail message will be available to the user of endpoint 100a if endpoint 100a fails to respond or is unavailable. Endpoint 100a may become unavailable if the endpoint 100a breaks, if endpoint 100a is unplugged, or for any suitable occurrence that causes endpoint 100a not to respond to a request from the user. The voicemail message is separated into segments and the segments are distributed among other endpoints 100. If endpoint 100a becomes unavailable, the user may retrieve the voicemail message using another endpoint 100 or externally from system 10. When calling from another endpoint 100 or externally from system 10, server 104 and/or endpoint 100b use distribution map 106 to locate and retrieve the distributed segments of the voicemail message in endpoints 100. After retrieving the distributed segments, server 104 and/or endpoint 100b combine the segments to reproduce the voicemail message for the user.

Modifications, additions, or omissions may be made to system 10 without departing from the scope of the invention. For example, in the illustrated embodiment, endpoint 100b contains a distribution map 106 of the voicemail message distribution of endpoint 100a. Endpoint 100b may participate in retrieving distributed segments of the voicemail message and combining the segments to reproduce the voicemail message. Moreover, one or more functions performed by server 104 may be implemented in whole or in part by endpoints 100. Additionally, system 10 may include any number of endpoints 100, networks 102, and servers 104. Any suitable logic comprising software, hardware, other logic, or any suitable combination of the preceding may perform the functions of system 10 and the elements within system 10.

Figure 2:
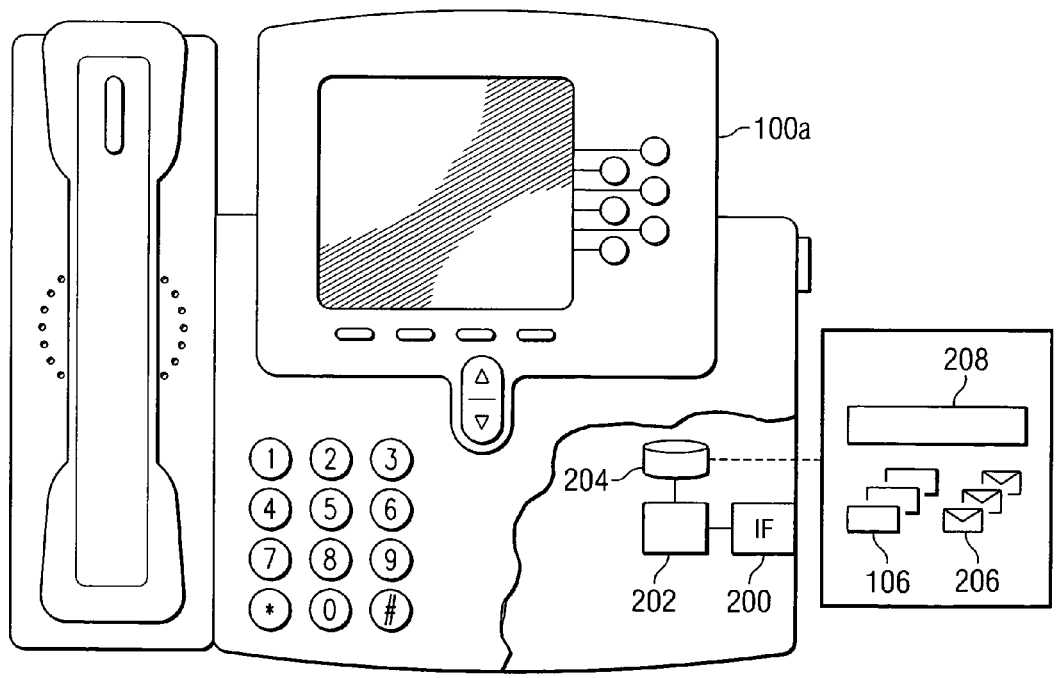
FIG. 2 illustrates an endpoint that has the ability to distribute the voicemail message within the system.

FIG. 2 illustrates endpoint 100 that has the ability to distribute a voicemail message within system 10. In the illustrated embodiment, endpoint 100 includes a network interface 200, a processor 202, and a memory 204.

Network interface 200 communicates information to and receives information from network 102. Network interface 200 represents any port or connection, real or virtual, including any suitable hardware and/or software that allow endpoint 100 to exchange information with network 102, other endpoints 100, or other elements of system 10.

Processor 202 controls the operation and administration of endpoint 100 by processing information received from network interface 200 and memory 204. Processor 202 includes any hardware, software, or both that operate to control and process information. For example, processor 202 may be a programmable logic device, a microcontroller, microprocessor, any suitable processing device, or any combination of the preceding.

Memory 204 stores, either permanently or temporarily, data, operational software, and other information for processor 202. Memory 204 includes any one or a combination of volatile or nonvolatile local or remote devices suitable for storing information. For example, memory 204 may include random access memory (RAM), read only memory (ROM), magnetic storage devices, or any other suitable information storage device or a combination of these devices. Memory 204 includes voicemail messages 206, endpoint list 208, and distribution maps 106. Endpoint 100 receives and stores voicemail messages 206 within memory 204. Voicemail message 206 may be stored as a file, bitstream, or other collection or arrangement of data (generally referred to as a file) in memory 204. The file may include any suitable information that identifies voicemail message 206 in addition to the contents of voicemail message 206. For example, voicemail message 206 may include the time and date of the call, the caller identification, or any suitable piece of information used to identify the call and/or voicemail message 206. Endpoint 100 distributes the segments of voicemail message 206 among other endpoints 100b-n after a triggering event occurs and optionally retains a copy of voicemail message 206. Memory 204 may include any suitable number of voicemail messages 206. Endpoint list 208 indicates endpoints 100b-n that endpoint 100 may distribute voicemail message 206. Endpoint list 208 may include endpoints 100 associated with a particular network 102, endpoints 100 associated with a particular endpoint 100, or any suitable endpoint 100 to distribute voicemail message 206. Endpoint 100 can maintain endpoint list 208 using any suitable peer-to-peer discovery tool, such as Cisco Discovery Protocol (CDP), or through other messaging and/or routing protocols supported by system 10.

Modifications, additions, or omissions may be made to endpoint 100. For example, any suitable endpoint 100 may operate as endpoint 100 that distributes voicemail messages 206 among other endpoints 100. As another example, processor 202 may control the distribution of voicemail message 206 using an operating system that has a voicemail distribution application. In an embodiment, server 104 may hold endpoint list 208, and endpoint 100a queries server 104 to determine which endpoints 100 to distribute voicemail message 206. Additionally, any suitable logic comprising software, hardware, other logic, or any suitable combination of the preceding may perform the functions of endpoint 100.

Figure 3:
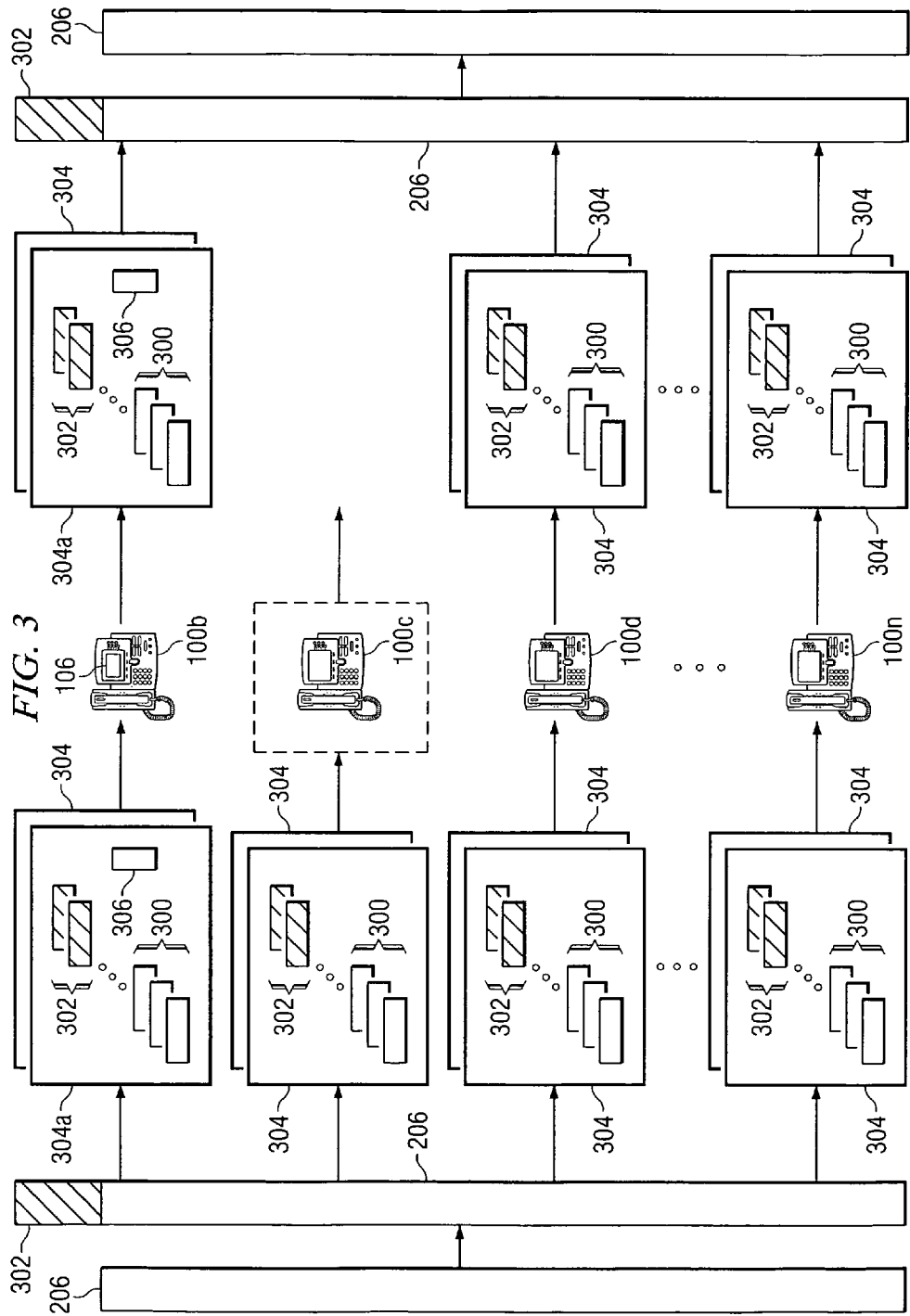
FIG. 3 illustrates the distribution and reconstruction of the voicemail message within the system.

FIG. 3 illustrates the distribution and reconstruction of voicemail message 206 within system 10. Voicemail message 206 is stored as a file comprised of media bits 300. Voicemail message 206 may include any suitable number of media bits 300. Media bits 300 are basic information units that may be represented by any two mutually exclusive states. For example, a media bit 300 may be a one or a zero or a true or a false. In an embodiment, error correction bits 302 are added to voicemail message 206 before voicemail message 206 is distributed among endpoints 100b-100n. Error correction bits 302 are bits that provide for the accurate transmission and/or storage of voicemail message 206. Error correction bits 302 use an error correction code that detects and/or corrects errors in the media by the use of some amount of redundant media. For example, error correction bits 302 allow voicemail message 206 to be reconstructed even if some of the original bits 300 are unavailable at the time of the voicemail request. The number of error correction bits 302 added to voicemail message 206 depends on the number of endpoints 100 in system 10 and the desired redundancy of system 10. Error correction bits 302 are carefully chosen to allow voicemail message 206 to be reconstructed if the original media bits 300 are lost, distributed in error, or any event causes media bits 300 to not be available for reconstruction. Any suitable error correction code may be applied to voicemail message 206 using error correction bits 302. For example, a Reed-Solomon error correction code may be applied to detect and correct problems in transmission and/or storage. The error correction code detects and/or corrects errors in the transmission or storage of media.

Each endpoint 100 receives one or more segments 304 of the distributed voicemail message 206. Segments 304 are a portion of voicemail message 206 that each endpoint 100 stores. In an embodiment, endpoints 100 may receive multiple segments 304. Segments 304 may be formed from any suitable information, such as media bits 300, error correction bits 302, and/or any other suitable information, and segments 304 may be formed in any suitable size. For example, some segments 304 may include only media bits 300 and other segments 304 may include only error correction bits 302. Accordingly, segments 304 that include only error correction bits 302 may be used only if an error occurs. In the illustrated embodiment, each segment 304 is formed to include media bits 300 and error correction bits 302. Segments 304 may include any suitable number of media bits 300 and/or error correction bits 302 depending on the size of voicemail message 206. The size of segments 304 may also depend on the total number of segments 304 that voicemail message 206 is separated into. For example, if two hundred twenty-three (223) media bits 300 are separated into sixteen (16) segments 304 among sixteen (16) endpoints 100, those segments 304 are larger than two hundred twenty-three (223) media bits 300 separated into thirty-two (32) segments 304 among sixteen (16) endpoints 100.

Segments 304 may also include a header 306 that provides information to identify media bits 300 associated with the distributed voicemail message 206. To identify media bits 300, header 306 may include any suitable information that describes the call, such as caller identification, time of the call, date of the call, or any suitable call information. In the illustrated embodiment, endpoint 100b receives segment 304a that includes header 306. Endpoint 100b may use header 306 and distribution map 106 to retrieve segments 304 from other endpoints 100 and reconstruct voicemail message 206.

Segments 304 of voicemail message 206 are distributed after the occurrence of a triggering event. A triggering event is any suitable event that initiates the distribution of segments 304 to endpoints 100. The triggering event may be a particular time of day, determining a particular number of voicemail messages 206 has been stored in endpoint 100, or any suitable triggering event.

In an example embodiment of operation, voicemail message 206 is stored on endpoint 100. A triggering event occurs that causes voicemail message 206 to be distributed among endpoints 100b-100n, where n represents any suitable integer number. In the illustrated embodiment, error correction bits 302 are added to voicemail message 206 before distribution. Voicemail message 206 is separated into segments 304, and each endpoint 100b-100n receives segments 304 of voicemail message 206. Segments 304 include media bits 300 and error correction bits 302. Segment 304a also includes header 306, which facilitates the retrieval of segments 304 during reconstruction of voicemail message 206. Media bits 300 within segment 304 are different media bits 300 of voicemail message 206. Therefore, each endpoint 100 receives different media bits 300.

Media bits 300 within segments 304 are distributed to segments 304 in any suitable manner. In an embodiment, media bits 300 within segments 304 are assigned to endpoints 100 sequentially, such as on a round-robin basis. Generally, endpoints 100 receive every (n−1) bit from the initial bit received until all bits are distributed, where n is an integer number representing the total number of endpoints 100 within system 10. This process may be used for media bits 300 and error correction bits 302. For example, sixteen (16) endpoints 100b-100q each receive one segment 304. Two hundred twenty-three (223) media bits 300 and thirty-two (32) error correction bits 302 are to be distributed within segments 304 to endpoints 100b-100q. The distribution of media bits 300 within segments 304 to endpoints 100 is as follows: endpoint 100b receives media bits 1, 17, 33, 49, 65, 81, 97, 113, 129, 145, 161, 177, 193, 209, and 222; endpoint 100c receives media bits 2, 18, 34, 50, 66, 82, 98, 114, 130, 146, 162, 178, 194, 210, and 223; and endpoint 100d receives media bits 3, 19, 35, 51, 67, 83, 99, 115, 131, 147, 163, 179, 195, and 211. Endpoints 100e-100q receive every $16^{th}$ media bit 300 from the initial media bit 300 received until distribution is complete.

If a user attempts to retrieve voicemail message 206 from endpoint 100 that stores voicemail message 206, but endpoint 100 is not responding, the user may retrieve voicemail message 206 from a reconstruction of distributed segments 304 among other endpoints 100. In the illustrated embodiment, endpoint 100c becomes unavailable before the user attempts to retrieve voicemail message 206. Therefore, media bits 300 and error correction bits 302 within segment 304 associated with endpoint 100b are not available during the reconstruction process. Error correction bits 302 within segments 304 of other endpoints 100 can identify missing media bits 300 stored by endpoint 100b.

Upon receiving the request to retrieve voicemail message 206, endpoint 100b uses distribution map 106 to poll endpoints 100d-100n for media bits 300 associated with voicemail message 206. Endpoint 100b may also poll endpoints 100d-100n using the information in header 306, which identifies voicemail message 206. Endpoint 100b retrieves media bits 300 from endpoints 100d-100n. Error correction bits 302 are used to identify missing media bits 300 from unavailable endpoint 100b. The retrieved media bits 300 and error correction bits 302 are combined. The user is provided with the original voicemail message 206 following the retrieval and combination of media bits 300 and error correction bits 302.

Modifications, additions, or omissions may be made to the system and method. For example, bits 300 may be distributed to endpoints 100 using any suitable algorithm or distribution method. As another example, any endpoint 100 may be designated as the polling endpoint 100 to retrieve bits 300 associated with voicemail message 206. Additionally, each endpoint 100 may have a pre-configured endpoint 100 to act on its behalf as the polling endpoint 100.

Figure 4:
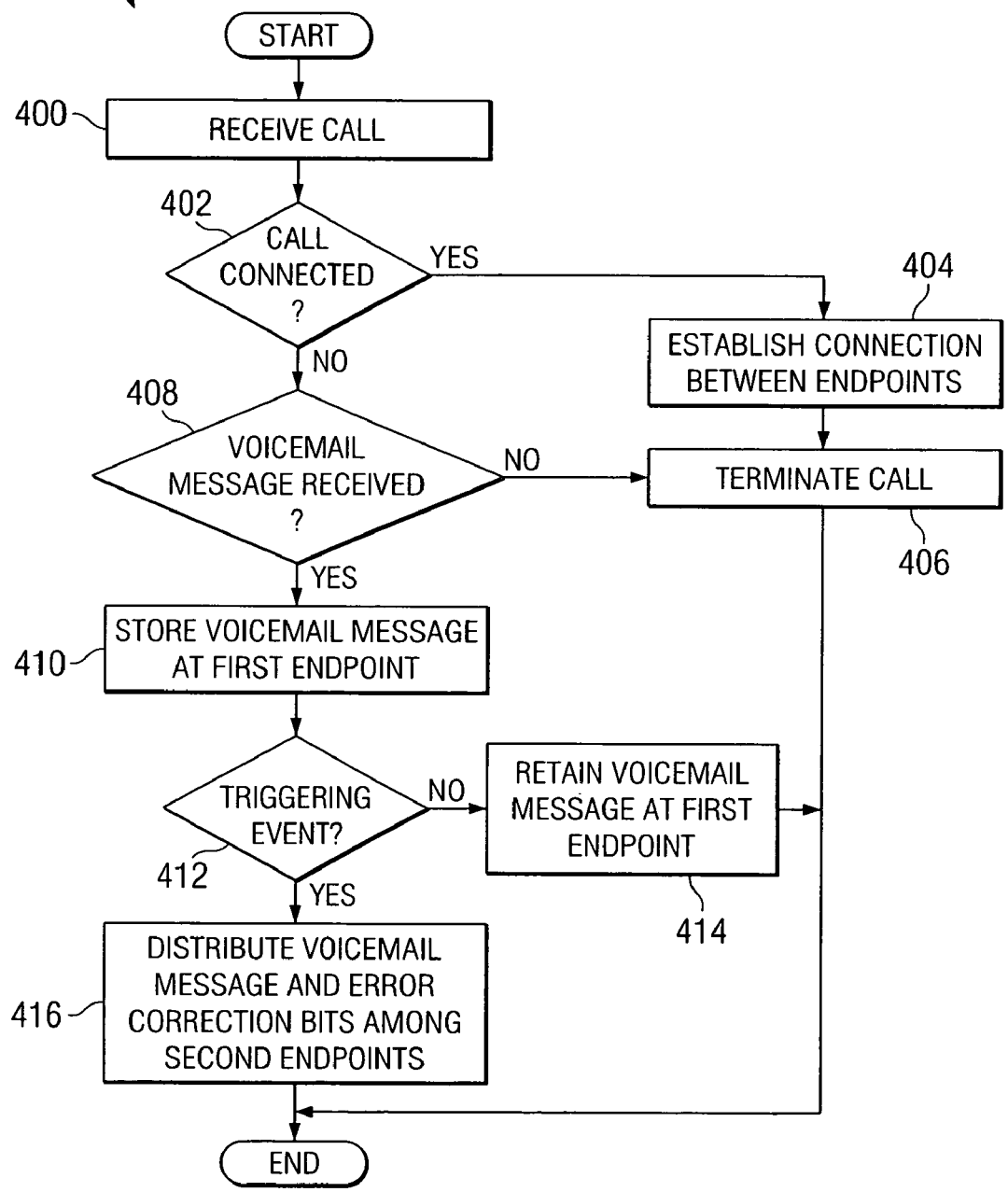
FIG. 4 is a flowchart that illustrates distributing the voicemail message to endpoints within the system.

FIG. 4 is a flowchart 40 that illustrates distributing a voicemail message 206 to endpoints 100 within system 10. Endpoint 100a receives a call from another endpoint 100 at step 400. If the call is connected at step 402, a connection between endpoints 100 is established at step 404. Upon completion of the call, endpoints 100 terminate the call at step 406 and the method ends.

If the call is not connected at step 402, the calling endpoint 100 has the option of leaving voicemail message 206 on endpoint 100a. Step 408 determines whether endpoint 100a receives voicemail message 206. If voicemail message 206 is not received, the call is terminated between endpoints 100 and the method ends. If endpoint 100a receives voicemail message 206, endpoint 100a stores voicemail message 206 at step 410. Endpoint 100a may store any suitable number of voicemail messages 206.

At step 412, endpoint 100a determines whether a triggering event has occurred to begin the distribution of stored voicemail messages 206. The triggering event initiates the distribution of voicemail messages 206 to other endpoints 100. If the triggering event is not detected, endpoint 100a retains voicemail message 206 at step 414. However, if endpoint 100a detects the triggering event, endpoint 100a distributes bits 300 of voicemail message 206 and error correction bits 302 among endpoints 100 included on endpoint list 208.

Modifications, additions, or omissions may be made to the method. For example, endpoint 100a may distribute voicemail message 206 upon receiving a forwarded voicemail or voicemail reply, receiving a group broadcast, or any suitable file transfer. As another example, the distribution of voicemail message 206 may occur immediately upon endpoint 100a storing a copy of voicemail message 206 instead of waiting for a triggering event. Additionally, steps may be performed in any suitable order.

Figure 5:
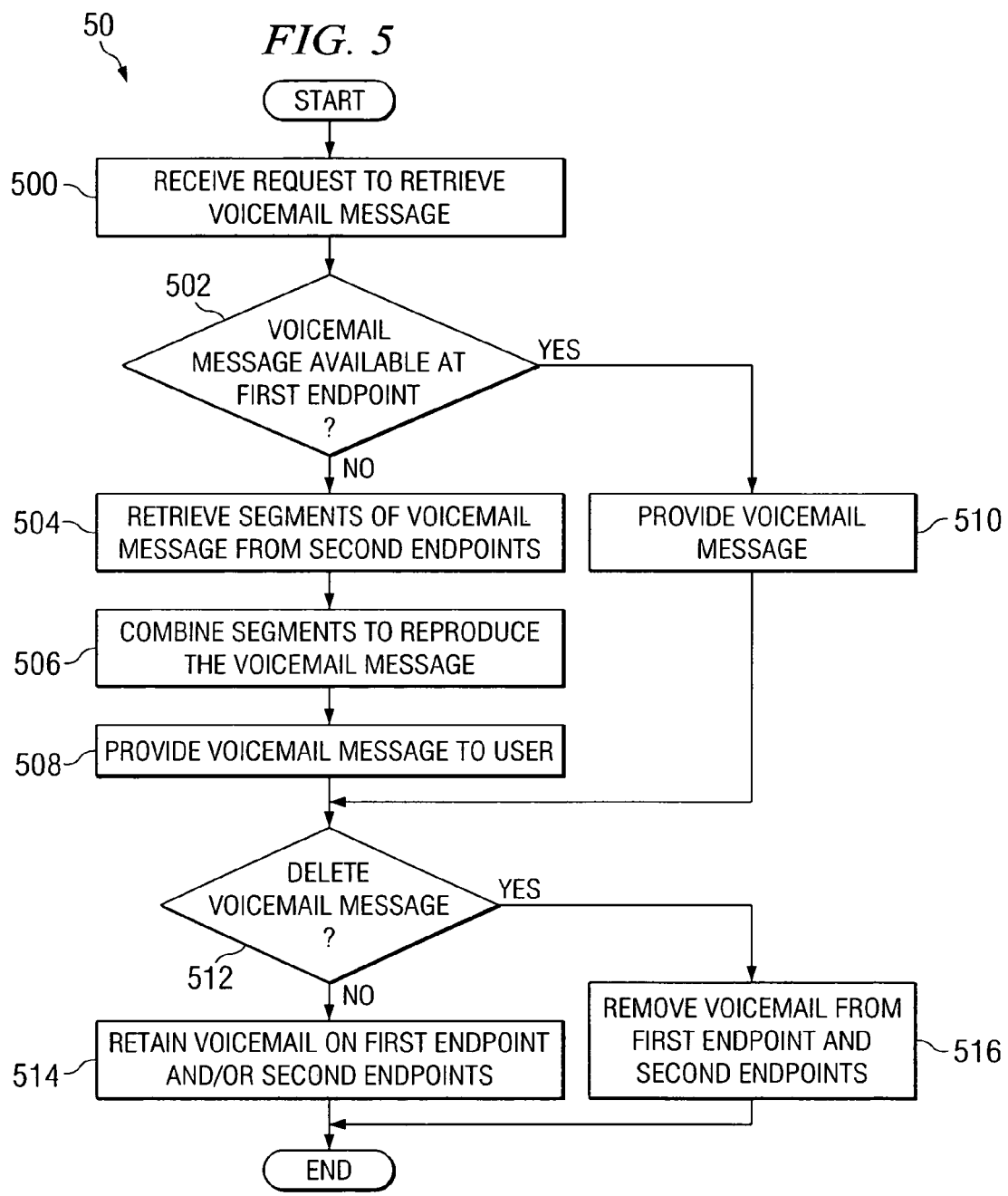
FIG. 5 is a flowchart that illustrates reconstructing the voicemail message from the endpoints.

FIG. 5 is a flowchart 50 that illustrates retrieving voicemail message 206 from endpoints 100. A user requests voicemail message 206 stored on endpoint 100a at step 500. System 10 determines whether voicemail message 206 is available at endpoint 100a at step 502. Endpoint 100a provides voicemail message 206 to the user at step 510 if endpoint 100a is operable when the user requests voicemail message 206. However, if voicemail message 206 cannot be retrieved from endpoint 100a, media bits 300 of voicemail message 206 are retrieved from other endpoints 100 at step 504. Error correction bits 302 are also retrieved to facilitate the determination of any media bits 300 that are missing if any endpoint 100 becomes unavailable. Server 104 or endpoint 100b determine from which endpoints 100 to retrieve media bits 300 and error correction bits 302 using distribution map 106. Server 104 or endpoint 100b combine segments 304 to reproduce the voicemail message at step 506 from the retrieved media bits 300 and error correction bits 302. The user is provided with voicemail message 206 at step 508.

Upon providing voicemail message 206 to the user, voicemail message 206 may be deleted if a delete event occurs at step 512. A delete event may be the user invoking a delete command, voicemail message 206 being stored for a certain number of days, or any other suitable delete event. If a delete event occurs at step 512, voicemail message 206 is removed from endpoint 100a and bits 300 and error correction bits 302 of voicemail message 206 are removed from endpoints 100 at step 516. If a delete event does not occur, endpoint 100a retains voicemail message 206 and/or other endpoints 100 retain bits 300 and error correction bits 302 of voicemail message 206 at step 514. The method subsequently ends.

Modifications, additions, or omissions may be made to the method. For example, when a delete event occurs, bits 300 and error correction bits 302 of voicemail message 206 may be deleted from endpoints 100 while a copy of voicemail message 206 remains on endpoint 100a. Additionally, steps may be performed in any suitable order.

Certain embodiments of the invention may provide one or more technical advantages. A technical advantage of one embodiment includes storing a voicemail message locally on an endpoint to provide a system that scales with the number of users. Therefore, users may be added easily to the system or easily deleted from the system. Another technical advantage of an embodiment includes distributing the voicemail message among endpoints in the system without having to use a central server for redundancy. The voicemail message is still available to the user even if a central server on the system becomes inoperable or goes down or the local endpoint storing the voicemail message becomes inoperable. Furthermore, using a peer-to-peer redundancy solution provides a cost-effective solution not available using a central server.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for storing a voicemail message in a communication environment, comprising:
   receiving a voicemail message at a first endpoint;
   separating the voicemail message into a plurality of segments;
   distributing the segments of the voicemail message to a plurality of second endpoints, wherein the segments comprise media bits;
   adding error correction bits to the voicemail message at the first endpoint, wherein a number of error correction bits depends on a number of second endpoints; and
   distributing the segments of the voicemail message to each second endpoint, the segments comprising error correction bits, wherein a second endpoint is operable to reconstruct the voicemail message from less than all of the segments using the error correction bits.

2. The method of claim 1, wherein a structure of the segments of the voicemail message comprises media bits and error correction bits.

3. The method of claim 2, further comprising:
   if the first endpoint is available, providing the voicemail from the first endpoint; and
   if the first endpoint is not available, retrieving less than all the segments associated with the voicemail message from the second endpoints, and combining the segments to reproduce the voicemail message.

4. The method of claim 1, wherein the distributed segments of the voicemail message comprise a header that identifies the first endpoint.

5. The method of claim 1, further comprising:
   determining the voicemail message to distribute if the first endpoint stores more than one voicemail message; and
   if a triggering event occurs, distributing the segments of the voicemail message.

6. The method of claim 1, further comprising assigning the media bits of the segments to a plurality of second endpoints on a sequential basis.

7. The method of claim 1, further comprising:
   if the first endpoint is available, providing the voicemail message from the first endpoint; and
   if the first endpoint is not available, retrieving the segments associated with the voicemail message from the second endpoints, and combining the segments to reproduce the voicemail message.

8. The method of claim 1, further comprising:
   removing the voicemail message from the first endpoint in response to a delete event; and
   removing the segments associated with the voicemail message from the second endpoints in response to the delete event.

9. A computer readable medium including logic for storing a voicemail message in a communication environment, the logic executed by a computer and causing the computer to perform the following steps:
   receive a voicemail message at a first endpoint;
   separate the voicemail message into a plurality of segments;
   distribute the segments of the voicemail message to a plurality of second endpoints, wherein the segments comprise media bits;
   add error correction bits to the voicemail message at the first endpoint, wherein a number of error correction bits depends on a number of second endpoints; and
   distribute the segments of the voicemail message to each second endpoint, the segments comprising the error correction bits, wherein a second endpoint is operable to reconstruct the voicemail message from less than all of the segments using the error correction bits.

10. The computer readable medium of claim 9, wherein a structure of the segments of the voicemail message comprises media bits and error correction bits.

11. The computer readable medium of claim 10, the logic further operable to:
if the first endpoint is available, provide the voicemail from the first endpoint; and
if the first endpoint is not available, retrieve less than all the segments associated with the voicemail message from the second endpoints, and combine the segments to reproduce the voicemail message.

12. The computer readable medium of claim 9, wherein the distributed segments of the voicemail message comprise a header that identifies the first endpoint.

13. The computer readable medium of claim 9, the logic further operable to:
determine the voicemail message to distribute if the first endpoint stores more than one voicemail message; and
if a triggering event occurs, distribute the segments of the voicemail message.

14. The computer readable medium of claim 9, the logic further operable to assign the media bits of the segments to a plurality of second endpoints on a sequential basis.

15. The computer readable medium of claim 9, the logic further operable to:
if the first endpoint is available, provide the voicemail message from the first endpoint; and
if the first endpoint is not available, retrieve the segments associated with the voicemail message from the second endpoints, and combine the segments to reproduce the voicemail message.

16. The computer readable medium of claim 9, the logic further operable to:
remove the voicemail message from the first endpoint in response to a delete event; and
remove the segments associated with the voicemail message from the second endpoints in response to the delete event.

17. A system for storing a voicemail message in a communication environment, comprising:
a first endpoint operable to receive a voicemail message, separate the voicemail message into a plurality of segments, and distribute the segments to a plurality of second endpoints, wherein the segments comprise media bits; and
the plurality of second endpoints operable to receive the distributed segments of the voicemail message, wherein the first endpoint is operable to:
add error correction bits to the voicemail message, a number of error correction bits depends on a number of second endpoints; and
distribute segments of the voicemail message to each second endpoint, the segments comprising the error correction bits, and a second endpoint is operable to reconstruct the voicemail message from less than all of the segments using the error correction bits.

18. The system of claim 17, wherein the first endpoint is operable to determine the voicemail message to distribute if the first endpoint stores more than one voicemail message, and distribute the segments of the voicemail message if a triggering event occurs.

19. The system of claim 17, wherein the first endpoint is operable to assign the media bits of the segments to a plurality of second endpoints on a sequential basis.

20. The system of claim 17, wherein the first endpoint is operable to provide the voicemail message if the first endpoint is available.

21. The system of claim 17, further comprising a server operable to retrieve the segments associated with the voicemail message from the second endpoints using a distribution map, and combine the segments to reproduce the voicemail message.

22. The system of claim 17, wherein a second endpoint of the plurality of second endpoints is operable to retrieve the segments associated with the voicemail message from the second endpoints using a distribution map, and combine the segments to reproduce the voicemail message.

23. The system of claim 17, further comprising a server operable to retrieve less than all the segments associated with the voicemail message and from the second endpoints, and combine the segments to reproduce the voicemail message.

24. The system of claim 17, wherein a second endpoint of the plurality of second endpoints is operable to retrieve less than all the segments associated with the voicemail message from the second endpoints, and combine the segments to reproduce the voicemail message.

25. The system of claim 17, wherein the first endpoint is operable to remove the voicemail message in response to a delete event, the plurality of second endpoints operable to remove the segments associated with the voicemail message in response to the delete event.

26. A system for storing a voicemail message in a communication environment, comprising:
means for receiving a voicemail message at a first endpoint;
means for separating the voicemail message into a plurality of segments;
means for distributing the segments of the voicemail message to a plurality of second endpoints, wherein the segments comprise media bits;
means for adding error correction bits to the voicemail message at the first endpoint, wherein a number of error correction bits depends on a number of second endpoints; and
means for distributing the segments of the voicemail message to each second endpoint, the segments comprising error correction bits, wherein a second endpoint is operable to reconstruct the voicemail message from less than all of the segments using the error correction bits.

27. A method for storing a voicemail message in a communication environment, comprising:
receiving a voicemail message at a first endpoint;
determining the voicemail message to distribute if the first endpoint stores more than one voicemail message;
adding error correction bits to the voicemail message at the first endpoint, wherein a number of distributed error correction bits depends on a number of second endpoints, and a second endpoint is operable to reconstruct the voicemail message from less than all of the segments using the error correction bits;
separating the voicemail message into a plurality of segments;
distributing the segments of the voicemail message to a plurality of second endpoints if a triggering event occurs, wherein the distributed segments of the voicemail message comprise media bits, error correction bits, and a header that identifies the first endpoint;
assigning the media bits of the segments to a plurality of second endpoints on a sequential basis;
if the first endpoint is available, providing the voicemail message from the first endpoint;

if the first endpoint is not available, retrieving the segments associated with the voicemail message from the second endpoints, and combining the segments to reproduce the voicemail message;

if the first endpoint is not available, retrieving less than all the segments associated with the voicemail message from the second endpoints, and combining the segments to reproduce the voicemail message;

removing the voicemail message from the first endpoint in response to a delete event; and removing the segments associated with the voicemail message from the second endpoints in response to the delete event.

\* \* \* \* \*